July 29, 1969    H. A. CLEMENTS ET AL    3,458,021
SYNCHRONOUS SELF-SHIFTING CLUTCHES
Filed July 11, 1967    4 Sheets-Sheet 4
Fig. 4.
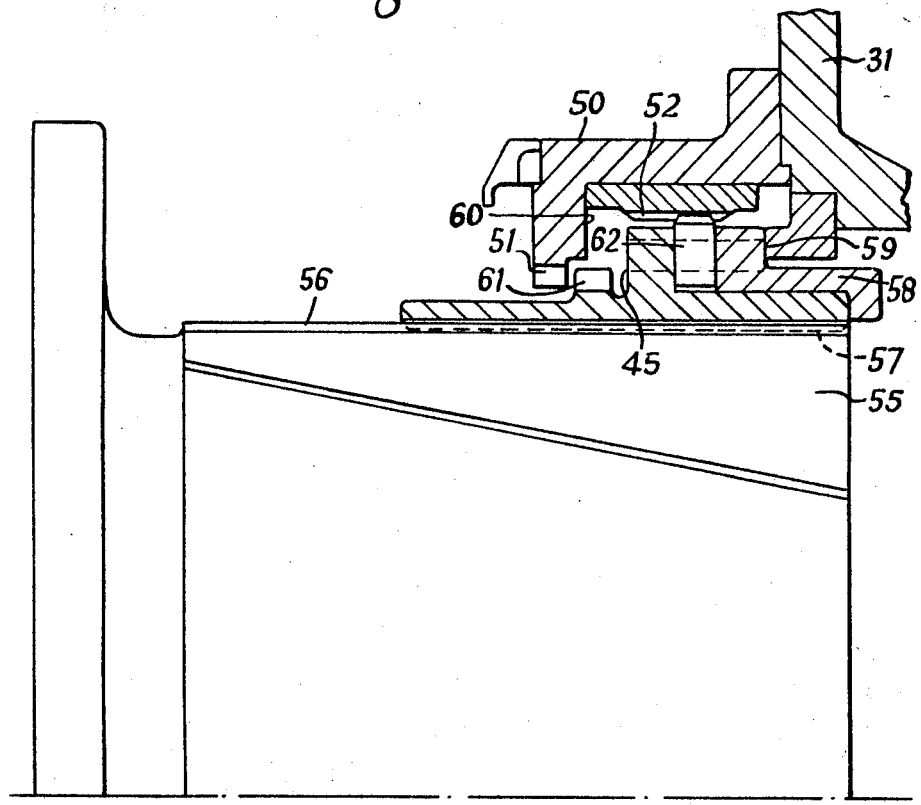
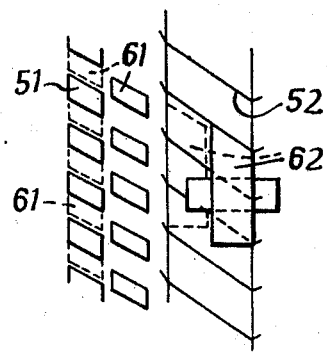

United States Patent Office 3,458,021
Patented July 29, 1969

3,458,021
SYNCHRONOUS SELF-SHIFTING CLUTCHES
Herbert A. Clements, Weybridge, Surrey, and Robert H. Heybourne, Thames Ditton, Surrey, England, assignors to S.S.S. Patents Limited, London, England, a British company
Filed July 11, 1967, Ser. No. 652,525
Claims priority, application Great Britain, July 20, 1966, 32,577/66; Aug. 24, 1966, 38,022/66
Int. Cl. F16d *11/04, 11/10, 13/22*
U.S. Cl. 192—67       10 Claims

ABSTRACT OF THE DISCLOSURE

A synchronous self-shifting toothed clutch in which clutch engagement involves the movement of an intermediate member relative to one of the clutch parts, this movement being initiated by pawl and ratchet mechanism. The coacting surfaces of the pawls and ratchet teeth are helical or chamfered so that the pressure between them creates an axial component of force which effects or assists the initiation of clutch engagement, the pressure being relieved prior to full clutch engagement by the coaction of other surfaces, so as to reduce the specific loading on the pawl and ratchet mechanism.

---

This invention relates to synchronous self-shifting toothed clutches of the type comprising first and second rotary clutch members and clutch actuating mechanism operative upon passage of said clutch members through rotational synchrononism relative to one another, said mechanism including an intermediate member constrained to move relative to one of said members to effect at least partial interengagement of the coacting clutch teeth.

The object of the invention is to facilitate the engaging movement of the clutch and to reduce the specific loading on the parts that coact to initiate clutch engagement.

In accordance with the invention, surfaces of clutch parts that coact to initiate clutch engagement upon passage of said clutch members through rotational synchronism have an inclination to the clutch axis, being e.g. of helical or chamfered form, such that the pressure between said surfaces when coacting creates an axial component of force in the direction to effect or assist the initiation of the clutch engaging movement, and the clutch includes other surfaces that during clutch engagement coact to relieve the first-mentioned surfaces from load prior to full driving engagement of the clutch teeth.

In the accompanying drawings, FIGS. 1 to 4 are half sections on the longitudinal axes of clutches according to the invention, each figure including a development view of clutch teeth, ratchet teeth and one of the pawls adapted to cooperate with the ratchet teeth.

Figure 1:
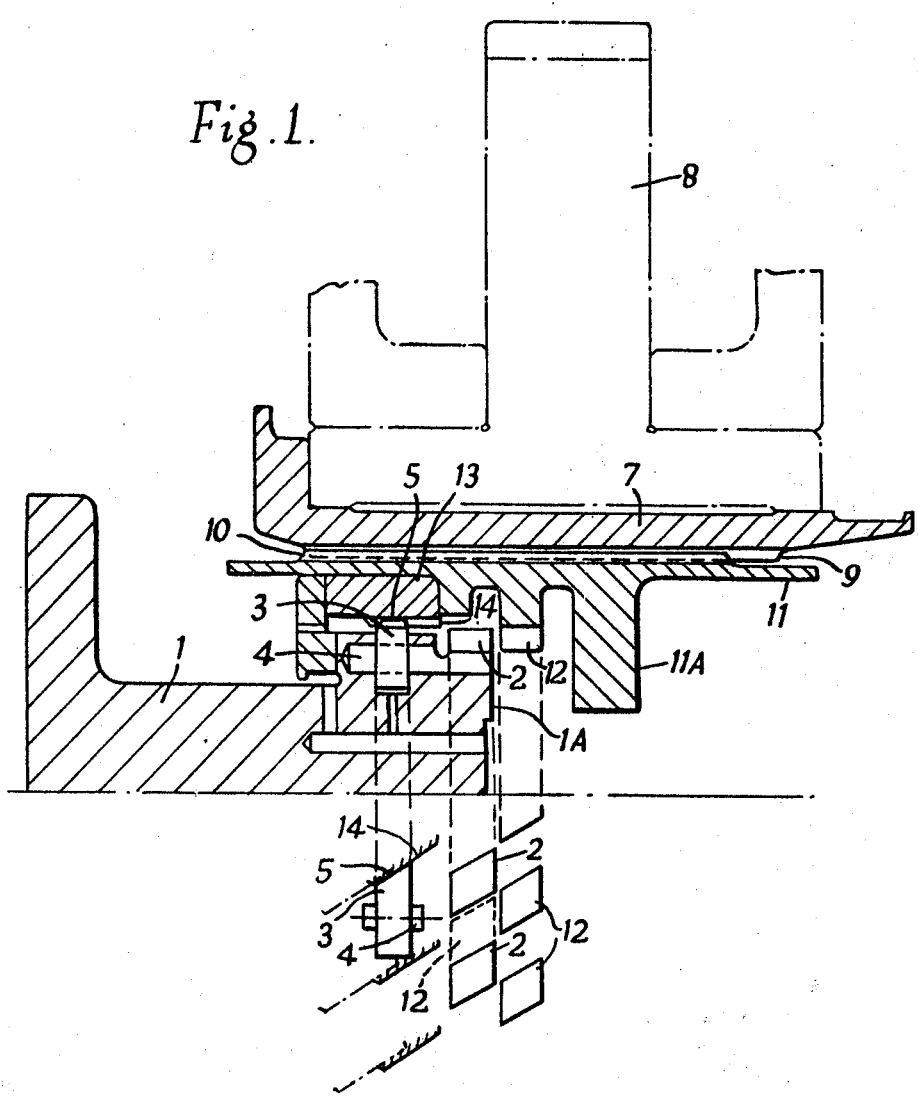

The clutch illustrated in FIGURE 1 comprises a first rotary clutch member constituted by a shaft 1, which carries a ring of external clutch teeth 2 and also carries pawls 3 mounted on pawl pins 4, the noses 5 of the pawls pointing radially outwards. Only one pawl 3 and its pawl pin 4 are shown. There may be for example two pairs of diametrically arranged pawls. The second rotary clutch member is constituted by a sleeve 7 which is carried within an input gear wheel 8 and internally is formed with straight splines 9 with which engage external straight splines 10 formed on an intermediate member 11, which is formed with a ring of internal clutch teeth 12, and carries a ring 13 formed with internal ratchet teeth 14. The faces of the clutch teeth 2 and 12 that coact to transmit power through the clutch when engaged are left hand helical with a helix angle of 30°. The coacting faces of the pawls 3 and the ratchet teeth 14 are also left hand helical with a helix angle of 35°.

The operation is as follows:

With the clutch in the disengaged condition shown, the clutch teeth 2 and 12 are spaced axially and the pawls 3 are in ratcheting position in relation to the ratchet teeth 14. With the shaft 1 rotating in one direction relative to the gear wheel 8, the pawls 3 ratchet past the ratchet teeth 14. When the direction of relative rotation of the shaft 1 and gear wheel 8 reverses, the helical faces of the pawls 3 drivably engage the helical faces of the ratchet teeth 14, and under these conditions the internal clutch teeth 12 are aligned precisely, with clearance, for interengagement with the external clutch teeth 2. The pressure between the engaged pawls 3 and ratchet teeth 14 has an axial component of force which acts on the ratchet teeth 14 and hence on the intermediate member 11 such that the intermediate member 11 is shifted to the left in the drawing, bringing the internal clutch teeth 12 into initial interengagement, with clearances, with the external clutch teeth 2. Owing to the different helical leads of the ratchet teeth 14 and the clutch teeth 2 and 12, the initial interengaging movement of the intermediate member 11 relative to the helical surfaces of the clutch teeth 2 is an oblique movement such that during the travel of the intermediate member 11 towards clutch engagement the driving faces of the clutch teeth 2 and 12 come into contact. The interaction of the clutch teeth 2 and 12 then creates an axial component of force such as to continue the movement of the intermediate member 11 to the left to the fully engaged position of the clutch teeth, and during this movement of the intermediate member 11 the different leads of the clutch teeth 2 and 12 on the one hand and the ratchet teeth 14 on the other hand causes the tips of the pawls 3 to be shifted away from the faces of the ratchet teeth 14, thereby unloading the ratchet teeth 14 and the pawls 3. When the clutch teeth 12 are fully engaged with the clutch teeth 2 as shown in broken lines in the development view, a flange 11A on the intermediate member 11 is against a stop 1A on the end of the first clutch member, so that further movement of the intermediate member 11 to the left is prevented and torque can be transmitted through the clutch.

If desired the splines 9 and 10 may be helical, as is conventional in synchronous self-shifting clutches comprising an intermediate member, as exemplified for example by the clutches illustrated in British patent specification No. 937,259, so that the action of the coacting helical faces of the pawls and ratchet teeth in initiating clutch engagement is assisted by the coaction of the helical splines interconnecting the intermediate member 11 and the second rotary clutch member 7. The use of straight splines 9 and 10 has the advantage, however, that axial expansion of the shaft 1 carrying with it the clutch assembly is permitted without affecting the axial relationship of the intermediate member relative to the other parts of the said clutch assembly. If desired also, the pawls 3 may coact with clutch teeth, as in the clutch illustrated in FIG. 1 of the above-mentioned specification, instead of with separate ratchet teeth.

Figure 2:
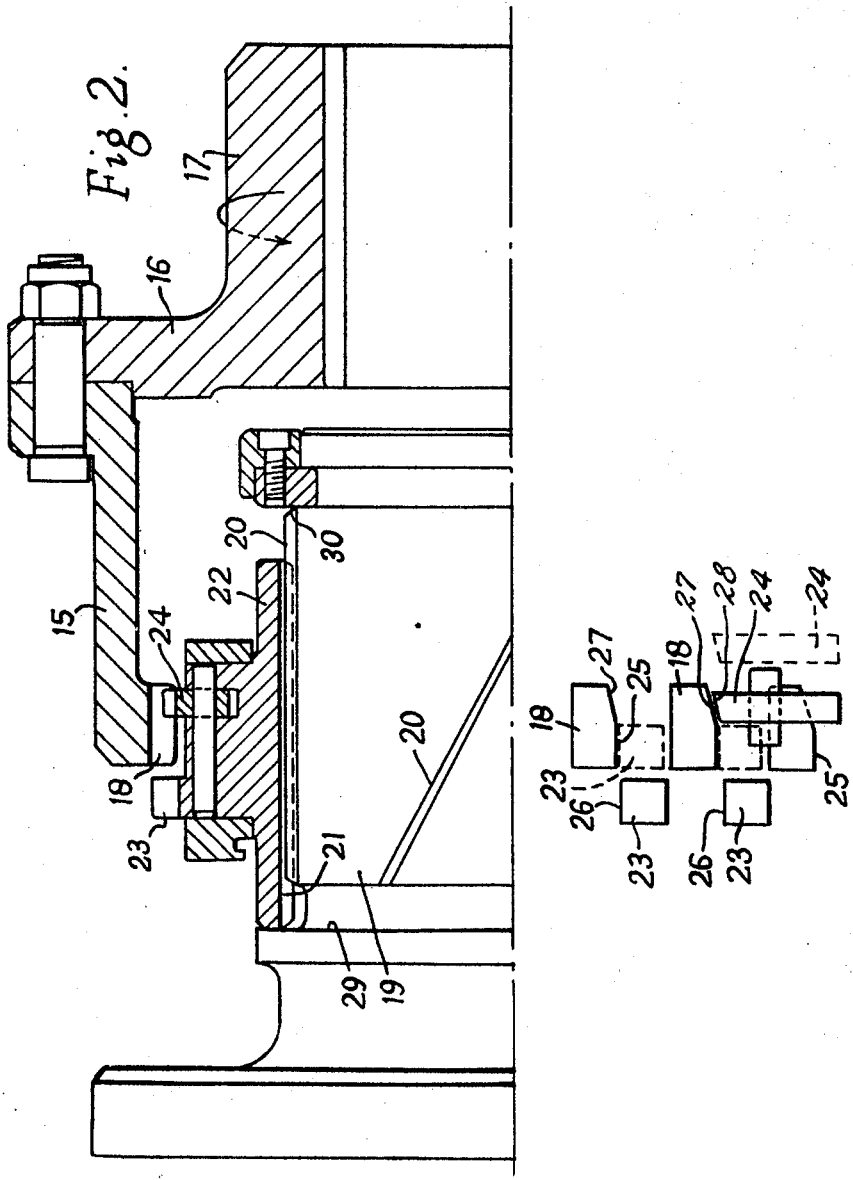

The clutch shown in FIG. 2 comprises a first rotary clutch member constituted by a ring 15 bolted to a flange 16 on a shaft 17, and formed with a ring of internal clutch teeth 18. A second rotary clutch member is constituted by a shaft 19 which is formed with external right hand helical splines 20 in which engage internal helical splines 21 in an intermediate member 22 formed with a ring of external clutch teeth 23 and carrying pawls, one of which is shown at 24. Whereas in the clutch shown in FIGURE 1 the pawls cooperate with a separate ring of ratchet teeth, in the present case the pawls 24 cooperate with the internal clutch teeth 18. As shown in the development view, the faces 25 and 26 respectively of the clutch teeth 18 and 23 that coact to transmit torque through the clutch are straight, viz. are parallel to the clutch axis, but the faces of the clutch teeth 18 with which the pawls 24 cooperate, which in the figure are the right hand ends of the faces 25, are of helical form as shown at 27 and the end faces of the pawl noses are correspondingly chamfered as shown at 28. The helix angle of the faces 27 and 28 may for example be 10°. End stops 29 and 30 serve to limit the helical movement of the intermediate member 22 relative to the shaft 19. Viewed from the left hand end as shown, the pawl noses point in anti-clockwise direction.

In operation, whilst the shaft 17 is rotating in the direction of the arrow faster than the shaft 19, the clutch teeth 18 ratchet relative to the pawls 24, and the parts of the clutch have the positions shown, with the clutch teeth 23 spaced axially from the clutch teeth 18. When the shaft 19 is accelerated and tends to overtake the shaft 17, the chamfered ends of pawls 24 engage helical surfaces 27, thereby aligning the clutch teeth 23 for precise interengagement with the clutch teeth 18 and shifting the intermediate member 22 helically relative to the shaft 19, to the right in the figure. The first part of this movement brings the clutch teeth 23 obliquely towards the clutch teeth 18, the pawls remaining in contact with the surfaces 27. Subsequently, the faces 26 of the clutch teeth 23 come into contact with the faces 25 of the clutch teeth 18, and thereafter the clutch teeth 23 slide axially along the clutch teeth 18 until they reach the positions of full driving engagement shown in broken lines in the development view. During this sliding movement of the clutch teeth 23 the noses of the pawls move axially out of contact with the helical surfaces 27, thereby relieving the surfaces 27 and 28 of load. When the clutch is fully engaged, with the clutch teeth 23 in the positions shown in broken lines, the intermediate member is against the stop 30.

When the shaft 19 is retarded, the shaft 17 overruns and the interaction of the clutch teeth 23 and 18 shifts the intermediate member 22 helically to the left relative to the shaft 19, thereby bringing the clutch teeth 23 out of engagement with the clutch teeth 18 and bringing the pawls back into ratcheting engagement with the clutch teeth 18.

Figure 3:
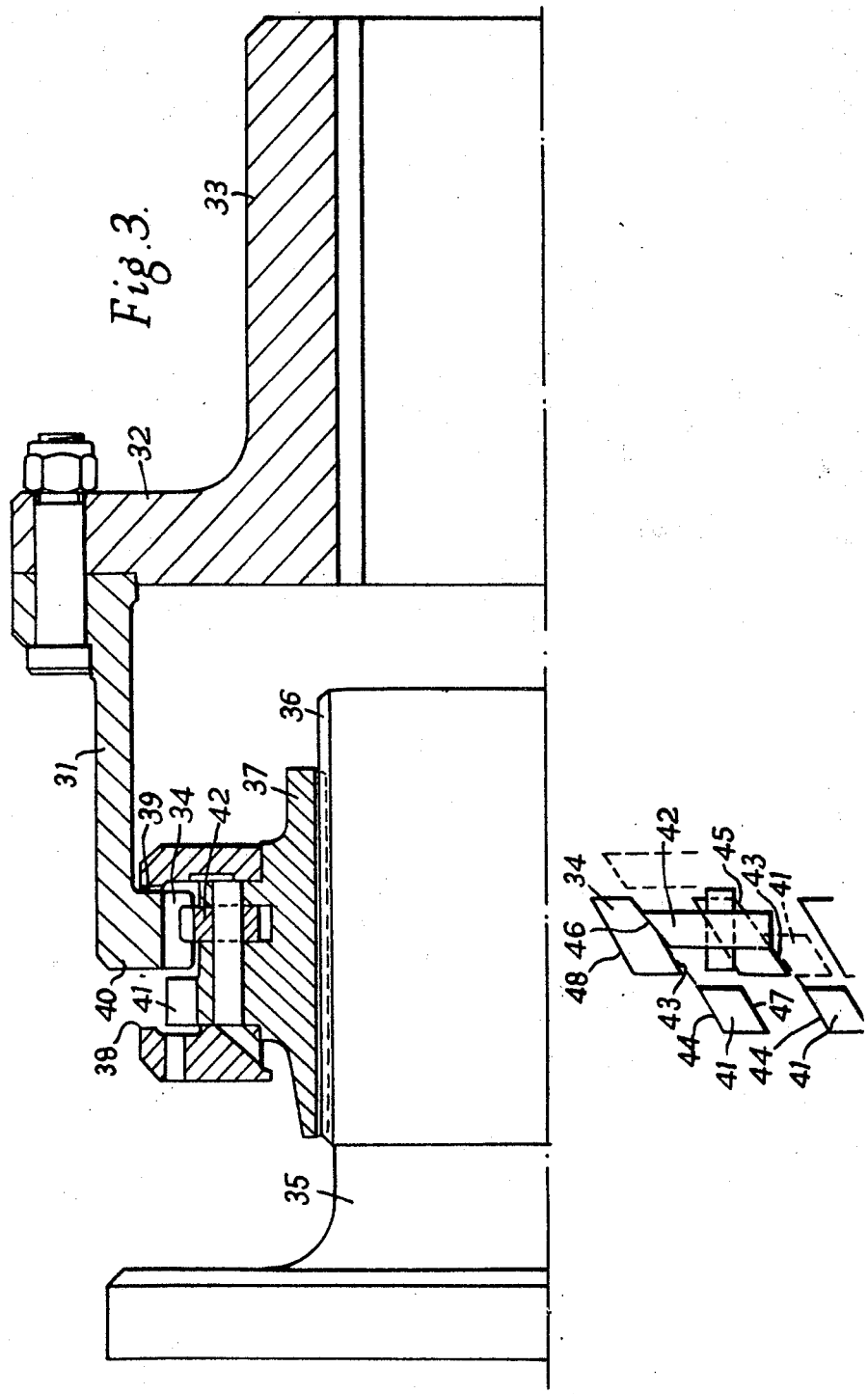

The clutch shown in FIGURE 3 comprises a first rotary clutch member constituted by a ring 31 bolted to a flange 32 on a shaft 33, and formed with internal clutch teeth 34. The second rotary clutch member is a shaft 35 formed with external straight splines 36 with which engage internal straight splines in an intermediate member 37, which is thus constrained for axial movement relative to the shaft 35, the movement of the intermediate member 37 being limited by axial stops 38 and 39 adapted to cooperate with the respective sides of a flange 40 on which the internal clutch teeth 34 are formed. The intermediate member 37 is formed with external clutch teeth 41 and carries pawls, one of which is shown at 42.

In this embodiment of the invention the internal clutch teeth 34 serve also as ratchet teeth for cooperation with the pawls 42. As is shown, the clutch teeth 41 are left hand helical. The faces 43 of the clutch teeth 34 which when the clutch is engaged to transmit torque cooperate with the faces 44 of the clutch teeth 41 are also helical, with a helix angle of for example 30°. The faces of the clutch teeth 34 with which the pawls 42 cooperate are also helical, as shown at 45, the helix angle being larger than the helix angle of the faces 43 and being for example 35°. The end faces 46 of the pawl noses are chamfered to correspond with the helical shape of the surfaces 45.

In operation, when viewed from the left hand end of the figure the shaft 33 is rotating in anti-clockwise direction relative to the shaft 35, the clutch teeth 34 ratchet relative to the pawls 42. When the shaft 35 is accelerated and tends to overrun the shaft 33, pawls 42 engage the helical surfaces 45, and the interaction of the chamfered surfaces of the ends of the pawls and the helical surfaces 45 has the effect that the intermediate member 37 is shifted to the right in the figure, relative to the shaft 35. The helical clutch teeth 41 therefore move axially to the right with an oblique movement relative to the helical clutch teeth 34, with the pawl noses remaining in contact with the faces 45, until prior to full engagement of the clutch the faces 44 of the clutch teeth 41 are in contact with the faces 43 of the clutch teeth 34. Then, owing to the different helix angles of the faces 43 and 45, the pawls move out of contact with the faces 45, so that the coacting faces of the pawls and of the clutch teeth 34 are relieved of load. When the clutch is fully engaged, with the clutch teeth 41 in the positions shown in broken lines in the development view, the stop 38 is against the left hand side of the flange 40.

When the shaft 35 is retarded and is overrun by the shaft 33, the interaction of the clutch teeth, which now have their non-driving faces 47 and 48 in contact, has the effect that the intermediate member 37 is shifted to the left relative to the shaft 33 until the stop 39 engages the flange 40. During this movement of the intermediate member the clutch teeth 41 move axially out of engagement with the clutch teeth 34, and the pawls resume the axial positions shown relative to the clutch teeth 34.

In the clutch illustrated in FIGURE 4, a first clutch member 50 is formed with a ring of right hand helical clutch teeth 51 and carries a ring of right hand helical internal ratchet teeth 52 of larger helix angle than the clutch teeth 51. For example, the helix angle of the clutch teeth 51 may be 30° and the helix angle of the ratchet teeth 52 may be 35°. The second clutch member 55 is formed with external right hand helical splines 56 of small helix angle, for example 8°, which are engaged with internal helical splines 57 in an intermediate member 58, which is thus constrained for slight helical movement relative to the second clutch member 55, the said movement being limited by stops 59 and 60. The intermediate member 58 is formed with external right hand helical clutch teeth 61 of the same helix angle as the internal clutch teeth 51, and carries pawls, one of which is shown at 62, adapted to cooperate with the ratchet teeth 52 and having chamfered noses corresponding with the helix angle of the ratchet teeth 52.

The operation is similar to that of the clutches already described with reference to FIGURES 1 to 3. The engagement of the clutch is initiated by the coaction of the pawls and ratchet teeth, and owing to the different helix angles of the ratchet teeth and the clutch teeth the pawls and rachet teeth are relieved from load prior to full engagement of the clutch.

We claim:

1. A synchronous self-shifting toothed clutch comprising first and second rotary members and clutch actuating means operative upon passage of said rotary clutch members through rotational synchronism relative to one another, said means including an intermediate member constrained to move relative to one of said members to effect at least partial interengagement of the coacting clutch teeth, including the improvements that surfaces of clutch parts that coact to initiate the clutch engaging movement of said intermediate member have an inclination to the clutch axis such that the pressure between the said surfaces when coacting creates an axial component of force in the direction to effect or assist the initiation of said clutch engaging movement, and that the clutch includes other surfaces that during clutch engagement coact to relieve the first-mentioned surfaces from load prior to full driving engagement of the clutch teeth.

2. A synchronous self-shifting clutch according to claim 1, wherein the said parts having said first-mentioned surfaces are constituted by pawl and ratchet mechanism the engagement of which creates an axial component of force on said intermediate member in the direction to interengage the clutch teeth, said other coacting surfaces having an inclination to the clutch axis such that the pawl or pawls is or are unloaded prior to full driving engagement of the clutch teeth.

3. A synchronous self-shifting clutch according to claim 2, wherein the ratchet surfaces with which the pawls are adapted to engage are formed on one of the sets of coacting clutch teeth.

4. A synchronous self-shifting toothed clutch comprising a first rotary clutch member, first clutch teeth carried by said first rotary clutch member, an intermediate member, second clutch teeth carried by said intermediate member, means constraining said intermediate member for movement relative to said second rotary clutch member to bring said second clutch teeth into and out of interengagement with said first clutch teeth, and pawl and ratchet mechanism operative to initiate movement of said intermediate member relative to said second rotary clutch member in the direction to effect at least partial interengagement of said first and second clutch teeth upon movement of said first and second rotary clutch members in one direction of relative rotation, with the improvements that said pawl and ratchet mechanism is formed with coacting surfaces inclined to the clutch axis whereby engagement of said mechanism provides an axial component of force on said intermediate member in the said direction, and that the clutch includes other surfaces that are in sliding contact during clutch engagement and which coact to separate said coacting surfaces of said pawl and ratchet mechanism prior to full driving engagement of said first and second clutch teeth.

5. A synchronous self-shifting toothed clutch according to claim 4 wherein said other surfaces that are in sliding contact during clutch engagement are the coacting driving surfaces of said first and second clutch teeth.

6. A synchronous self-shifting toothed clutch according to claim 4, wherein said first and second clutch teeth have axially straight driving surfaces and said other surfaces are constituted by surfaces of helical splines that constitute said constraining means.

7. A synchronous self-shifting toothed clutch comprising a first rotary clutch member, first clutch teeth carried by said first rotary clutch member, an intermediate member, second clutch teeth carried by said intermediate member, means constraining said intermediate member for axial movement relative to said second rotary clutch member to bring said second clutch teeth into and out of interengagement with said first clutch teeth, and pawl and ratchet mechanism operable to initiate movement of said intermediate member in the direction for interengagement of said first and second clutch teeth upon movement of said first and second rotary clutch members in one direction of relative rotation, said pawl and ratchet mechanism comprising pawls carried by one of said first and intermediate members and ratchet teeth carried by the other of said first and intermediate members, with the improvements that said pawls and ratchet teeth have coacting surfaces inclined to the clutch axis at an angle such that engagement of said pawl and ratchet mechanism provides an axial component of force on said intermediate member in the direction for moving said intermediate member to interengage said first and second clutch teeth, and that said first and second clutch teeth have driving surfaces inclined to the clutch axis at an angle such that the interaction of said driving surfaces effects separation of the coacting surfaces of said pawls and ratchet teeth prior to full engagement of the clutch.

8. A synchronous self-shifting toothed clutch comprising a first rotary clutch member, first clutch teeth carried by said first rotary clutch member, a second rotary clutch member, an intermediate member, second clutch teeth carried by said intermediate member, helical splines constraining said intermediate member for helical movement relative to said second rotary clutch member to bring said second clutch teeth into and out of interengagement with said first clutch teeth, said first and second clutch teeth having axially straight driving surfaces, and pawl and ratchet operable to initiate movement of said intermediate member relative to said second clutch member in the direction for interengagement of said first and second clutch teeth upon movement of said first and second rotary clutch members in one direction of relative rotation, with the improvements that said pawl and ratchet mechanism comprises pawls carried by one of said first and intermediate members, that the noses of said pawls and said ratchet surfaces are inclined at an angle to the clutch axis such that operation of said pawl and ratchet mechanism provides an axial component of force on said intermediate member in the direction to assist movement thereof to initiate interengagement of said first and second clutch teeth, and such that the interaction of said axially straight driving surfaces together with the action of the helical splines causes said pawls and said ratchet surfaces to separate from one another prior to full engagement of the clutch.

9. A synchronous self-shifting toothed clutch comprising a first rotary clutch member, first clutch teeth carried by said first rotary clutch member, a second rotary clutch member, an intermediate member, second clutch teeth carried by said intermediate member, splines constraining said intermediate member for movement relative to said second rotary clutch member to bring said second clutch teeth into and out of interengagement with said first clutch teeth, and pawl and ratchet mechanism for initiating movement of said intermediate member relative to said second rotary clutch member to interengage said first and second clutch teeth upon movement of said first and second rotary clutch members in one direction of relative rotation, with the improvements that said splines are axially straight, that said pawl and ratchet mechanism comprises pawls carried by one of said first and intermediate members and ratchet surfaces formed on the clutch teeth carried by the other of said first and intermediate members, that the noses of said pawls and said ratchet surfaces are inclined to the clutch axis at an angle such that operation of said pawl and ratchet mechanism provides an axial component of force on said intermediate member in the direction to move said intermediate member to initiate interengagement of said first and second clutch teeth, and that the said first and second clutch teeth have drawing surfaces inclined to the clutch axis at an angle such that the interaction of said driving surfaces during clutch engagement causes said pawl noses and said ratchet surfaces to separate from one another prior to full clutch engagement.

10. A synchronous self-shifting toothed clutch comprising a first rotary clutch member, first clutch teeth carried by said first rotary clutch member, a second rotary clutch member, an intermediate member, second clutch teeth carried by said intermediate member, helical splines constraining said intermediate member for helical movement relative to said second rotary clutch member to bring said second clutch teeth into and out of interengagement with said first clutch teeth, and pawl and ratchet mechanism operative to initiate movement of said intermediate member in the direction to interengage said first and second clutch teeth upon movement of said first and second rotary clutch members in one direction of relative rotation, said pawl and ratchet mechanism comprising pawls carried by one of said first and intermediate members and ratchet teeth carried by the other of said first and intermediate members, with the improvements that the coacting surfaces of said pawls and said ratchet teeth are inclined to the clutch axis at an angle such that operation of said pawl and ratchet mechanism provides an axial component of force on said intermediate member in the direction to urge said intermediate member to move in the direction, relative to said second rotary clutch member, to interengage said first and second clutch teeth, and that the said first and second clutch teeth have driving surfaces inclined to the clutch axis at an angle such that the interaction of said driving surfaces during clutch engagement causes said coacting surfaces of said pawls and said ratchet teeth to separate from one another prior to full engagement of the clutch.

References Cited
UNITED STATES PATENTS
2,913,084   11/1959   Short.

CARLTON R. CROYLE, Primary Examiner

A. D. HERRMANN, Assistant Examiner

U.S. Cl. X.R.

74—339; 192—46